Patented May 9, 1944

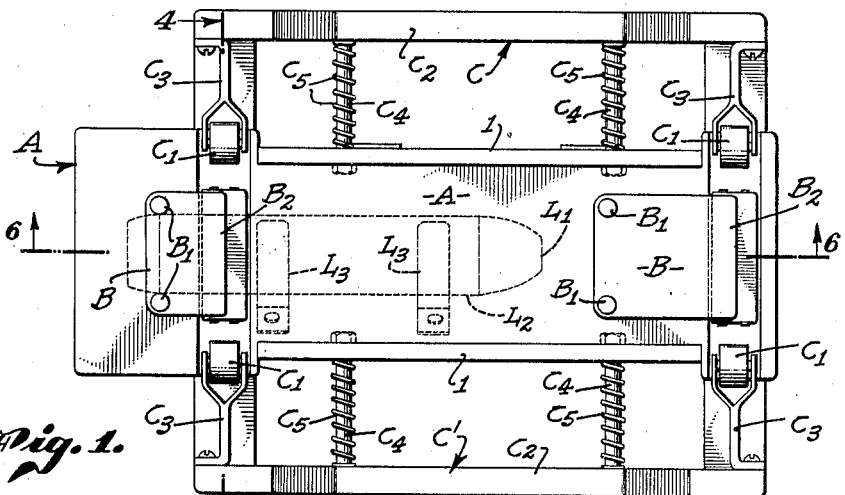
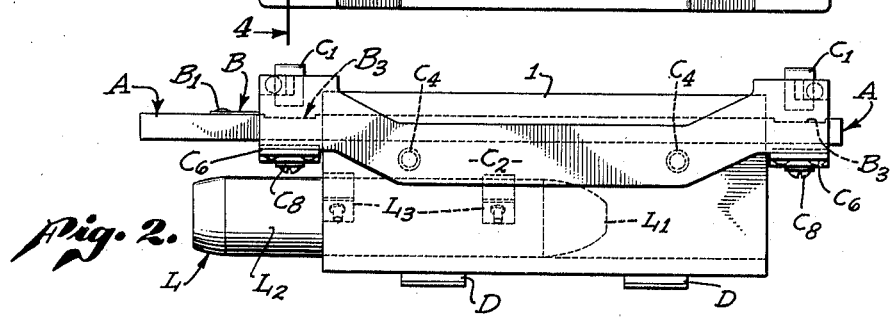
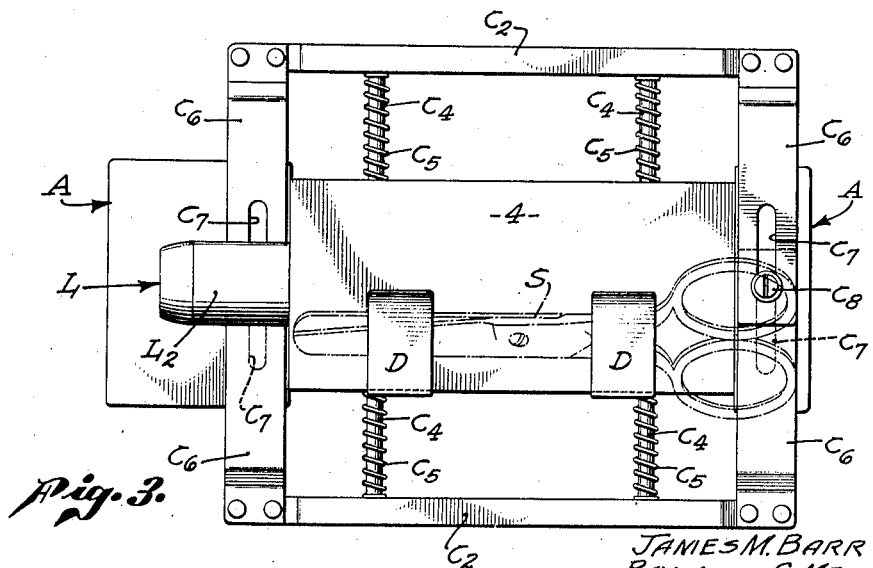

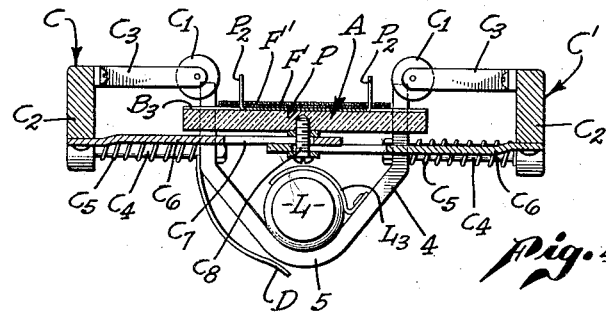
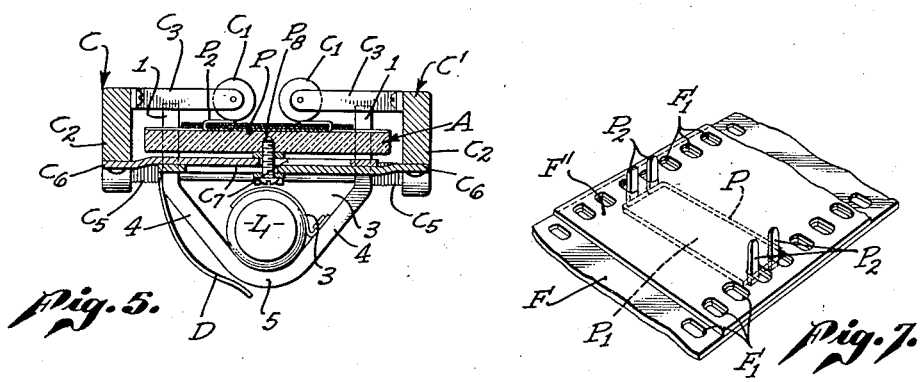
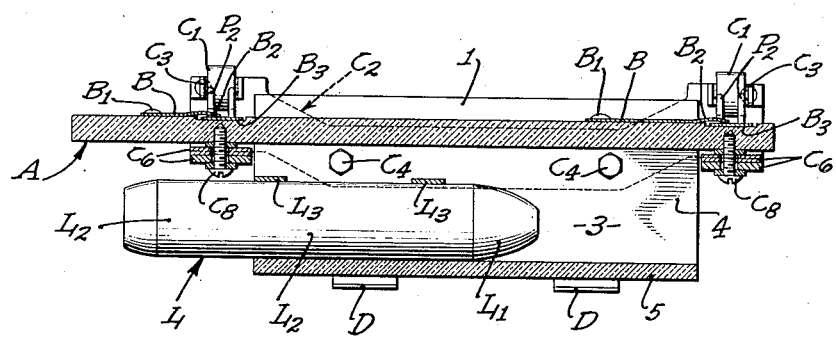
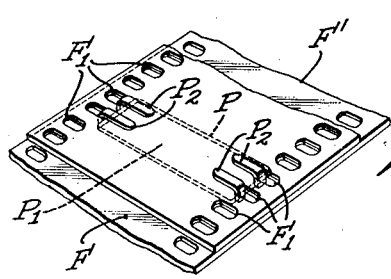

2,348,237

UNITED STATES PATENT OFFICE 2,348,237

FILM PATCHING JIG

James M. Barr and Raymond C. Mercer, Los Angeles, Calif.; said Barr assignor to said Mercer Application August 8, 1941, Serial No. 405,974

12 Claims. (Cl. 153—1)

This invention comprehends the provision of a device adapted to receive and hold overlapped sections of motion picture firm in patching position relative to a device known in the art as a "film patch," by means of which the two sections of film may be suitably spliced together.

An object is to provide a film patching device with an elongated base for supporting the sections of film in patching position, means for holding the "patches" so that the prongs thereof will extend through the sprocket perforations of the two sections, and means carried by the base which is operative for bending and forming the prongs of the "patch" in clinched positions for firmly holding the two sections of film together for use.

Another object is to form the base of a light transmitting material, preferably a modern plastic, over which the patching or splicing is done, and including an electric lamp supported adjacent the base so as to permit the use of the patching device in dark rooms.

Other objects may appear as the description progresses.

We have shown a form of device embodying our invention in the accompanying drawings, subject to modification, within the scope of the appended claims, without departing from the spirit of the invention.

In said drawings:

Fig. 1 is a top plan view of an assembled device;

Fig. 2 is a side elevation of the same;

Fig. 3 is a bottom plan view;

Fig. 4 is a sectional elevation on line 4—4 of Fig. 1, showing sections of film held thereon in patching position and with the jig expanded;

Fig. 5 is a section similar to Fig. 4 but showing the jig contracted, as at the close of a patching operation;

Fig. 6 is a longitudinal section on line 6—6 of Fig. 1;

Fig. 7 is a fragmentary perspective view of portions of two films positioned relative to a "film patch" preparatory to a contraction of the jig; and Fig. 8 is a view similar to Fig. 7 showing the "patch" clinched over the films, as at the completion of a patching operation.

In a suitable form for accomplishing the objects of the invention, we provide an elongated base A formed of transparent or translucent plastic material and formed with lateral upstanding sides I, I which terminate short of the opposite ends of the base and are transversely spaced to correspond to the width of the film to be spliced— usually of 35 mm. width, thereby forming guides for the film so that when overlapped sections are laid thereon as at F and F', as in Fig. 4, the sprocket perforations $F_1$ on opposite sides of the film sections will be longitudinally alined. Near each opposite end of base A and on the upper surface thereof we provide a spring "patch" holding clip B which is secured to base A at one extremity as by means of rivets or screws $B_1$ while their free ends $B_2$ are tensioned and at least partially overlie transverse grooves $B_3$ which receive standard metal "patches" P. Said patches P (see Fig. 7) have flat body portions $P_1$ and a plurality of prongs or teeth $P_2$ normally bent at right angles to their body portion and are spaced apart so that when they are seated in the grooves $B_3$ the teeth on each side will readily extend through the perforations $F_1$ on film sections F and F', thereby holding the film sections against longitudinal movement and the desired frames of the film sections in registration, preparatory to a patching operation. The free ends $B_2$ of the spring clips B yieldably engage the bodies $P_1$ of the patches P with sufficient tension to prevent accidental displacement of the patches and yet permit the ready removal of the patches and film at the completion of the patching operation.

Below the plane of base A a light compartment 3 is formed which corresponds substantially in length to the sides I, I, and has lateral diagonal walls 4, 4, which are joined centrally by an arcuate portion 5, the compartment thereby formed being preferably open at its ends.

For the purpose of forming and clinching the teeth $P_2$ of the patches over the film sections F and F' we provide a pair of laterally expansible and contractible units C and C' adapted for manual operation, each unit including a pair of longitudinally spaced rollers $C_1$, a longitudinal bar $C_2$ outwardly of base A, brackets $C_3$ attached to said bars and on which said rollers are rotatably held normally in positions for inward movement over and for forming the teeth $P_1$ into the positions shown in Fig. 8.

Units C and C' are each operatively supported on the base by means of a pair of rods $C_4$ which have their outer ends fixed to the bars $C_2$ and their inner ends slidable in the sides I of the base. Each rod $C_4$ has a compression spring $C_5$ thereon positioned between its particular bar and the adjacent side I of the base, so as to normally urge the bars outwardly to the positions shown in Figs. 1 and 4. Transverse guide members $C_6$ are attached to the ends of bars $C_2$ and extend inwardly beneath the base A with the members $C_6$ arranged transversely in pairs, and one of the members of each pair overlying the other member of the same pair, as shown in Figs. 3, 4 and 5. Members $C_6$ have elongated slots $C_7$ through which a screw $C_8$ carried by base A extends, there being one screw for each pair of guide members $C_6$.

Compartment 3 is arranged to hold an electric light L, preferably with a ruby bulb or lens $L_1$ and a barrel or case $L_2$ which may house the usual battery cells and lamp common to flashlights and thus adapting the device to use in a dark room.

Light L is removably held in position by means of one or more spring clips $L_3$ so that it may be inserted in or removed from the base when moved longitudinally.

As shown particularly in Fig. 3 one or more spring clips D may be provided on the exterior of a portion 4 of the base for removably supporting a pair of scissors S by means of which the torn or surplus end portions of the film sections F and F' may be cut.

It may be noted that the patch holders B are mounted with their free ends facing in the same direction (to the right in Fig. 1) so that the patches P may be inserted readily in the grooves $B_3$ by slight movement to the left so that their central flat bodies $P_1$ will rest under the portions $B_2$ of the holders and their teeth $P_2$ will be upstanding in order that the films may be readily laid thereon with teeth $P_2$ extended through the perforations $F_1$ of the films. Following the placement of the patches and films preparatory to a patching operation the bottom of the base may be held in one hand while the units C and C' are grasped by the other hand and said units contracted by pressure against the tension of springs $C_5$. Thus, on the inward movement of bars $C_2$ and rollers $C_1$ the rollers first overrun the marginal portions of films F and F' until they engage, depress and overrun the teeth $P_2$ into the flat positions shown in Fig. 5, at which time said rollers have reached their inner extremes of movement. The rollers $C_1$, bars $C_2$ and associated parts will be automatically restored to their normal positions as shown in Fig. 4 upon release of the bars $C_2$ and the spliced films together with their patches may be readily withdrawn from the jig by a slight pull to the right which will release the same from the holders B.

What we claim, is:

1. A film patching device comprising: a base having transversely spaced guides and a flat surface between said guides for receiving overlapped sections of film, means for removably supporting patches on said base in a plane beneath the lowermost film section, said patches having erect teeth at opposite extremities for extension through the sprocket perforations in said film sections, and laterally disposed means movable inwardly from opposite sides over said base, said film sections and said teeth for forming and clinching the teeth over the film sections so as to splice said film sections, said patch supporting means including transverse grooves in said base, and spring members fixed to said base and having their free ends overlying intermediate portions of said patches.

2. A film patching device comprising: a base having transversely spaced longitudinal guides and a flat horizontal surface between said guides for receiving overlapped sections of film, said surface having transverse grooves for removably supporting patches on said base and beneath the lowermost film section, said patches having erect teeth at opposite extremities for extension through the sprocket perforations in said film sections, and means at opposite edges of the film sections movable over said base, said film sections and said teeth for forming and clinching the teeth over the film sections so as to rest upon the uppermost film section and to splice said film sections, said movable means including a pair of manually operable members movable in the direction of each other in a splicing operation and having elements engaging the teeth of said patches.

3. A film patching device comprising: a base having transversely spaced guides and a flat surface longitudinally disposed between said guides for receiving overlapped sections of film, transverse grooves in said base for removably supporting patches on said base and beneath the lowermost film section, said patches having erect teeth at opposite extremities for extension through the sprocket perforations in said film sections, and means on each side of and movable transversely over said base, said film sections and said teeth for forming and clinching the teeth of said patches over the film sections so as to splice said film sections, said movable means including a pair of manually contractible members movable in the direction of each other and having elements engaging marginal portions of the uppermost film sections and the teeth of said patches for bending the extended portions of the teeth flatwise over the uppermost film section, and means for retracting said manually operable members upon the release thereof at the completion of a patching operation.

4. A film patching jig comprising: a base having a flat top portion and laterally spaced guides disposed longitudinally of the film and between which guides overlying sections of photographic film may be supported on said top portion with the sprocket perforations thereof in registration for a patching operation, said top portion being transversely grooved at positions adjacent the ends of the film sections for receiving patching elements with upstanding teeth extended through said perforations, normally expanded and manually contractible clinching units mounted on opposite sides of said base and provided with clinching elements normally disposed outwardly of the edges of the films and movable inwardly over the overlapping film sections into engagement with and for bending said teeth downwardly over the uppermost film section.

5. A film patching jig as characterized in claim 4 in which said lateral film guides terminate short of the path of said clinching elements and extend below said top portion so as to provide a mounting for said clinching units.

6. A film patching jig as characterized in claim 4 in which said top portion is formed of a light transmitting material and said base has a portion on the opposite side of the top portion for supporting a lamp for illuminating said film sections.

7. A film patching jig as characterized in claim 4 including: means depending from said top portion for expansibly and contractibly supporting said clinching units, and springs compressible between corresponding portions of the base and portions of said clinching units for restoring said units to normally expanded positions following manual operations thereof to splice said film sections.

8. A film patching jig as characterized in claim 4 including a pair of spring clips mounted on the top of the base outwardly of said grooves and having free portions overlying said grooves and portions of the film sections, for holding the film sections in engagement with the teeth of the patching elements.

9. A film patching jig as characterized in claim 4 including longitudinal bars on said clinching units, transverse guides attached at their outer extremities to said bars and engaging portions of said base, and springs compressible between said bars and said longitudinal guides at the sides of the base.

10. A film patching jig as characterized in claim 4 including: parallel bars on said clinching units movably disposed outwardly of the opposite sides of said base, brackets attached to said bars, and roller clinching members carried by said brackets in alinement with the grooves in the top of the base.

11. A film patching jig as characterized in claim 4 including: parallel bars on said clinching units movably disposed outwardly of the opposite sides of said base, brackets attached to said bars, roller clinching members carried by said brackets in alinement with the grooves in the top of the base, and transverse members supported on the base and connected with said bars for guiding the clinching elements laterally over the film sections.

12. A film patching jig as characterized in claim 4 including: longitudinally disposed members on said clinching units adapted to be gripped by the hand of an operator for contracting the units, transverse guides supported on said base and connected with said longitudinal members, and springs interposed between said base and said longitudinal members for urging the clinching units outwardly to normally inoperative position.

JAMES M. BARR.
RAYMOND C. MERCER.